Patented Sept. 26, 1944

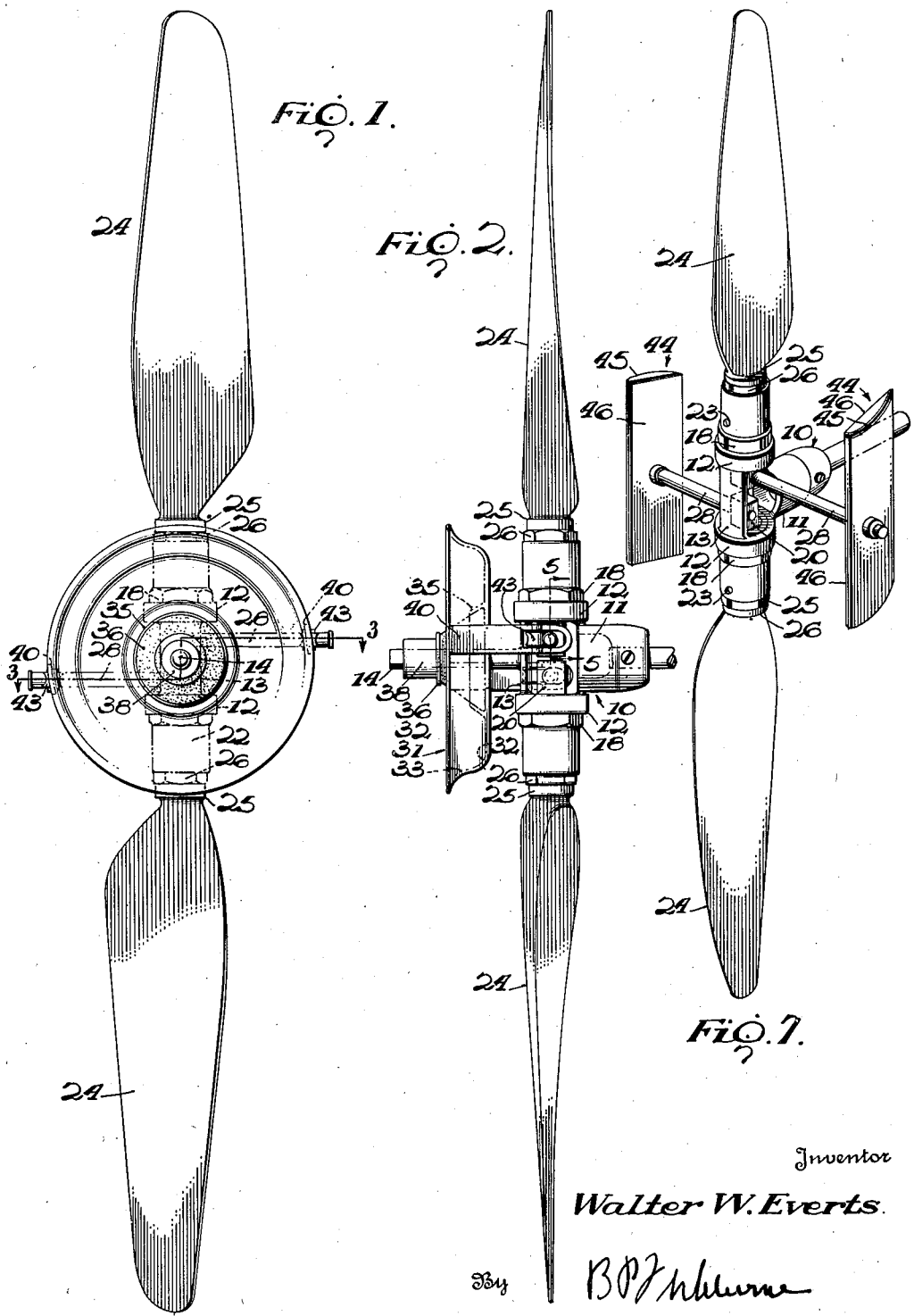

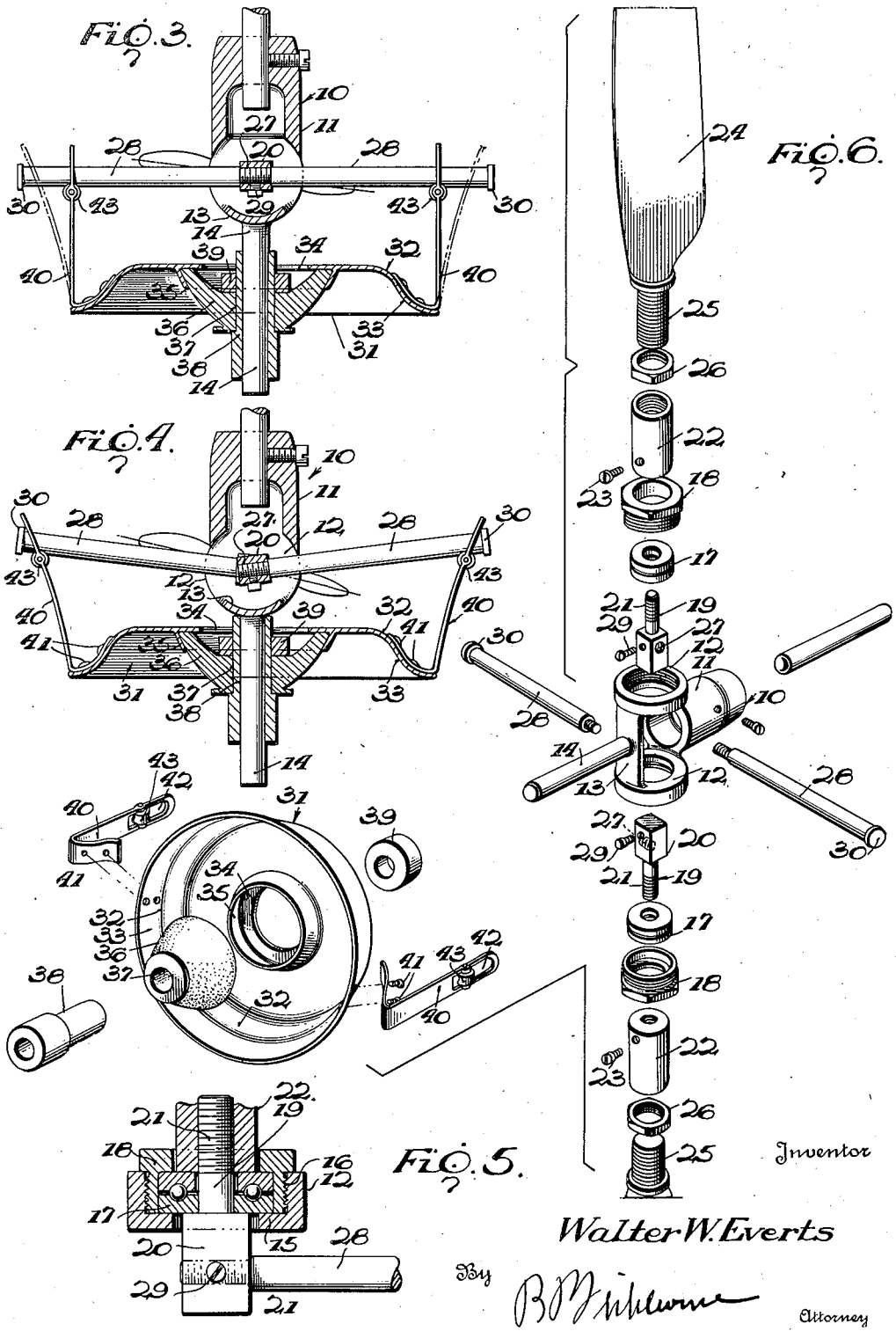

2,358,967

UNITED STATES PATENT OFFICE 2,358,967

VARIABLE PITCH PROPELLER

Walter W. Everts, Baltimore, Md., assignor to Everel Propeller Corporation, Baltimore, Md., a corporation of Maryland Application October 6, 1942, Serial No. 460,993

5 Claims. (Cl. 170—162)

My invention relates to variable pitch propellers for operation within a fluid medium such as air or water.

An important object of the invention is to provide a propeller for aircraft or the like, the blades of which have their pitch automatically varied by a pressure element, responsive to changes in pressure caused by the travel of the aircraft, while the torque of the motor remains substantially constant.

A further object of the invention is to provide a propeller of the above mentioned character so constructed that the variable pitch blades will have the desired minimum pitch when the propeller is rotating and the aircraft is not travelling, while the pitch of the blades will be automatically increased when the aircraft is in flight, the torque of the motor remaining substantially constant, but the R. P. M. of the motor automatically slows down without adjustment of the throttle.

A further object of the invention is to provide centrifugally operated means for maintaining the blades at the minimum desired pitch when the propeller is rotating and while the aircraft is not travelling, operating in conjunction with pressure operated means thrown into action during the travel of the aircraft and overcoming the centrifugal action of the centrifugally operated means, to automatically increase the pitch of the propellers.

A further object of the invention is to provide a pressure operated element arranged substantially in advance of the propeller and so shaped that the air pressure acting upon its front face produces the maximum pressure thereon, while a suction is produced upon the rear face of the pressure element, in addition to the suction action produced by the centrifugal action of the rotating blades.

A further object of the invention is to connect the pressure actuated element with the blades in a manner to increase the leverage of the connection, in swinging the blades to vary their pitch.

A further object of the invention is to provide connecting means between the pressure actuated element and generally radial stabilizing arms which serve to vary the pitch of the blades, the stabilizing arms assuming inclined positions to increase the pitch of the blades and the connecting means moving outwardly toward the outer ends of the arms by virtue of their inclination, to increase the leverage.

A further object of the invention is to provide centrifugally operated means for connecting the pressure element and the stabilizing arms so that the centrifugally operated means automatically moves toward the outer ends of the stabilizing arms to increase the leverage for turning the blades when increasing their pitch.

A further object of the invention is to provide a universal mounting for the pressure operated element so that this element in addition to normally varying the pitch of the blades will also permit of a differential pitch action between the blades when the aircraft is turning in a sharp curve.

A further object of the invention is to mount separate pressure operated elements upon the stabilizing arms.

Other objects and advantages of the invention will be apparent during the course of the following description.

In the accompanying drawings forming a part of this application and in which like numerals are employed to designate like parts throughout the same, Figure 1 is a front elevation of a variable pitch propeller embodying my invention, Figure 2 is an edge elevation of the same, Figure 3 is a horizontal section taken on line 3—3 of Figure 1, showing the stabilizing arms in the radial position and the blades at the desired minimum pitch, Figure 4 is a similar view, showing the stabilizing arms shifted to the rear inclined position and the blades at the maximum pitch, Figure 5 is a detailed section taken on line 5—5 of Figure 2, Figure 6 is an exploded perspective view of the propeller, and, Figure 7 is a perspective view of a propeller embodying a modified form of the invention.

In the drawings, wherein for the purpose of illustration is shown preferred embodiments of my invention, attention being called first to Figures 1 to 6, inclusive, the numeral 10 designates the hub of the propeller, comprising a sleeve 11 which is suitably rigidly mounted upon the drive shaft of the engine of aircraft or other vehicles. The sleeve has collars 12, preferably formed integral therewith, and these collars are connected at their front by a web 13, also preferably formed integral therewith. The collars 12 are cylindrical and their axes are radial with respect to the sleeve 11. The web 13 has a shaft 14 projecting forwardly beyond same and rigidly secured thereto and the longitudinal axis of this shaft is in alinement with the longitudinal axis of the sleeve 11.

The collars 12, see Figure 5, are provided at their inner ends with inwardly projecting flanges 15, and these collars are internally screw threaded, as shown at 16. Arranged within each collar 12 is an end-thrust bearing 17, held in position by a ring-nut 18, having a screw threaded portion engaging the screw threads 16. Extending through the center of the bearing 17 is a coupling-rod 19, provided at its inner end with a head 20. The coupling rod is provided with screw threads 21 upon its outer portion, and this outer screw threaded portion has screw threaded engagement within a radial coupling sleeve 22, these parts being held against accidental separation by any suitable means such as a set screw or set screws 23. The numeral 24 designates variable pitch blades which are of the conventional airfoil construction. Each blade 24 is provided at its inner end with a screw threaded shank 25, preferably formed integral therewith, and this shank is screw threaded into the coupling sleeve 22, and these parts are locked together by a lock-nut 26.

The heads 20 are provided with openings 27, to receive stabilizing arms 28. These arms have their inner ends threaded into the openings 27 and the parts are held against accidental displacement by said screws 29 or the like. The stabilizing arms 28 extend outwardly beyond the hub 10 and pass through the openings between the rings 12 and are radial when the blades are at the desired minimum pitch. These stabilizing arms swing in a direction longitudinally of the axis of rotation of the hub. The stabilizing arms are provided at their ends with heads 30, suitably screwed thereto.

Disposed preferably upon the front of the propeller is a pressure operated element or disc 31, which is preferably circular and stiff. This pressure element or disc is of airfoil formation and has a generally concave front surface and a rear cambered surface, as shown at 32, produced by an inclined or transversely curved marginal portion 33. The element or disc 30 is provided centrally thereof with a large opening 34, having a considerably larger diameter than the shaft 14. Upon the front side of the element or disc 30 is annular flange 35, spaced from the opening 34 and surrounding the same, and receiving and holding a flexible or resilient coupling 36, preferably formed of rubber. This coupling has an opening 37, to receive the reduced end of a sleeve 38 and a ring 39, positioned at the rear of the coupling 36, and clamped to the sleeve 38. The sleeve 38 is slidably mounted upon the shaft 14. Since the element or disc 31 is acted upon by centrifugal force when the propeller is driven it will remain concentric with the shaft 14 and very little strain is placed upon the coupling 36. By virtue of the shape in cross section of the element or disc 31 the air pressure acting upon the front face of this element or disc during the travel of the vehicle is increased, while a suction is created upon the rear face of the element or disc 31 by virtue of the camber 32 and the suction action created by the centrifugal force of the blades drawing the air away from the element 31. The element 31 will therefore be pushed rearwardly from its front side and pulled rearwardly from its rear side.

The numeral 40 designates a pair of connecting arms, disposed at the rear of the element or disc 31 and secured thereto, at 41. These connecting arms extend generally longitudinally of the axis of rotation of the element or disc 31. The connecting arms 40 are resilient and are acted upon by centrifugal force and will be swung outwardly by centrifugal force, as indicated by the dotted lines. At their rear ends these connecting arms 40 have elongated slots 42, receiving the outer ends of the stabilizing arms 28. Rollers 43 are disposed in the slots 42 and are mounted upon the connecting arms and these rollers are disposed at the front of the stabilizing arms 28 and engaged therewith. It is thus apparent that when the pressure element or disc 31 moves rearwardly with respect to the shaft 14, this movement will be transmitted to the stabilizing arms 28, through the medium of the connecting arms 40, whereby the stabilizing arms 28 will assume rearwardly inclined positions. This rearwardly inclined position of the stabilizing arms 28 is shown in Figure 4, and the inclination of the stabilizing arms will cause the rollers 43 to travel more readily toward the outer ends of the stabilizing arms, and this action is also aided by the free ends of the connecting arms 40 moving outwardly by centrifugal force. The heads 30 prevent the connecting arms from separating from the stabilizing arms 28.

The operation of the propeller is as follows: When the propeller is being driven while the aircraft or the like is not travelling, the stabilizing arms 28 are acted upon by centrifugal force and maintained in a radial position. These arms in turn hold the blades 24 in a position so that they have the desired minimum pitch. In taking off, the engine of an airplane is usually throttled wide open and the propeller will be driven at the maximum speed which may be 2000 R. P. M. When the aircraft is placed in flight it is customary to reduce the speed of the engine considerably below the maximum speed. This is done by the operator and automatically reduces the torque. When my propeller is used, the blades being at the desired minimum pitch before the flight is started, the propeller may be driven at the maximum speed. When the aircraft is placed into flight, the travel of the aircraft causes the air currents to exert a rearward pressure upon the front face of the pressure operated element or disc 31 and a suction upon the rear face, with the result that the element 31 is shifted rearwardly upon the shaft 14 and the stabilizing arms 28 are swung rearwardly and the blades 24 are turned upon their longitudinal axis to increase the pitch of the blades. When this occurs the speed of the engine will be automatically slowed down but it will be found that the torque of the motor while rotating at the reduced speed will remain substantially constant to the torque when rotating at the higher speed. This takes place with the throttle remaining unchanged.

Since the element or disc 31 has a universal mounting upon the shaft 14, it will permit of a differential pitch action between the propeller blade for having a smooth operation. This differential of pitch adjustment is effected by the air pressure upon the blades and under these conditions the element or disc 31 and associated elements permit of this differential action.

In Figure 7 I have shown a modified form of the invention. In this form of the invention the element or disc 31 and connecting arms 40 are omitted and pressure operated elements 44 are rigidly attached to the outer ends of the stabilizing arm 28. These elements 44 are disposed in the plane of rotation of the blades 24 and extend longitudinally of the blades and preferably terminate at the outer ends of the sleeves 22. Each element 44 has an airfoil formation with an outer cambered surface, as shown at 45 and an inner preferably flat surface 46. These elements 44 are tilted upon their longitudinal axes so that they converge rearwardly. All other parts of the propeller remain the same as described in connection with the first form of the invention.

The operation of this form of the propeller is as follows: When the propeller is being driven before the aircraft is in flight, the stabilizing arms 28 are in the radial position and the blades 24 assume the desired minimum pitch. When the aircraft is in flight, the rearward action of the air pressure acting upon the pressure elements 44 shift them rearwardly turning the stabilizing arms rearwardly and increasing the pitch of the blades of the propellers. This will slow down the engine without changing the throttle adjustment and it will also be found that the torque of the motor remains the same.

Having thus described the invention, what I claim is:

1. A propeller comprising a hub, blades mounted upon the hub to turn about their axes to vary their pitch, generally radial arms connected with the blades, the arms movable rearwardly of the hub to assume inclined positions to increase the pitch of the blades, a pressure operated element movable longitudinally of the hub, and connecting arms secured to the element and engaging the outer portions of the arms and shifted laterally toward the outer ends of the arms by the inclination of the arms.

2. A propeller comprising a hub, blades mounted upon the hub and movable with relation thereto to vary their pitch, generally radial arms connected with the blades, a pressure operated element arranged near the hub, and centrifugally operated elements connected with the pressure operated element and engaging the arms and movable toward the outer ends of the arms.

3. A propeller comprising a hub, blades mounted upon the hub and movable with relation to the hub to vary their pitch, generally radial arms connected with the blades, a pressure element arranged near the hub, and resilient connecting arms secured to the hub and connected with the generally radial arms.

4. A propeller comprising a hub, blades mounted upon the hub and movable with relation thereto to vary their pitch, a shaft connected with the hub and extending axially of the same, a sleeve mounted upon the shaft to move longitudinally thereof, an air pressure element, a universal mounting connecting the air pressure element with the sleeve, and means connecting the element with the blades, the air pressure element being engaged by the air pressure caused by the travel of the aircraft or the like and shifted thereby rearwardly upon the shaft.

5. A propeller for aircraft or the like, comprising a hub, a shaft attached to the forward end of the hub and extending axially thereof, generally radial blades having shanks pivotally mounted upon the hub so that the shanks and blades turn upon their longitudinal axes to vary the pitch of the blades, generally radial arms attached to the shanks and swinging axially of the hub, an air pressure element arranged in advance of the hub to engage with air pressure caused by the travel of the aircraft and to be shifted thereby rearwardly and axially of the hub, a universal mounting attached to the air pressure element and slidable upon said shaft, and arms attached to the air pressure element and engaging the generally radial arms, the generally radial arms being acted upon by centrifugal force to turn the blades to reduce their pitch.

WALTER W. EVERTS.